United States Patent [19]

Noose

[11] 4,311,130
[45] Jan. 19, 1982

[54] FLUE DEVICE

[76] Inventor: Theodore Noose, 4401 W. Verdugo, Burbank, Calif. 91505

[21] Appl. No.: 75,334

[22] Filed: Sep. 13, 1979

[51] Int. Cl.³ .............................................. F24C 1/16
[52] U.S. Cl. .................................. 126/25 B; 126/306
[58] Field of Search .................. 126/9 R, 25 B, 59.5, 126/29, 279, 306; D23/90.1; 248/174, 188.7; 110/239, 241

[56] References Cited

U.S. PATENT DOCUMENTS

| | | | |
|---|---|---|---|
| D. 223,722 | 5/1972 | Stehouwer | D23/90.1 |
| 1,118,537 | 11/1914 | Dodds | 126/9 R |
| 3,112,716 | 12/1963 | Knight | 126/25 B |
| 3,192,918 | 7/1965 | Ridgway | 126/25 B |

Primary Examiner—Albert J. Makay
Assistant Examiner—Harold Joyce
Attorney, Agent, or Firm—Grover A. Frater

[57] ABSTRACT

A fire starter having a relatively short chimney extending upwardly from a skirt in the form of a truncated cone is made more effective by the use of a venturi at the junction of skirt and chimney, and by the use of radial flow directors at the underside of the skirt, and by giving the chimney a truncated conical form.

The short chimney, which unfolds, and division of the skirt into two generally semi-circular sections facilitates assembly and disassembly and adds portability.

14 Claims, 5 Drawing Figures

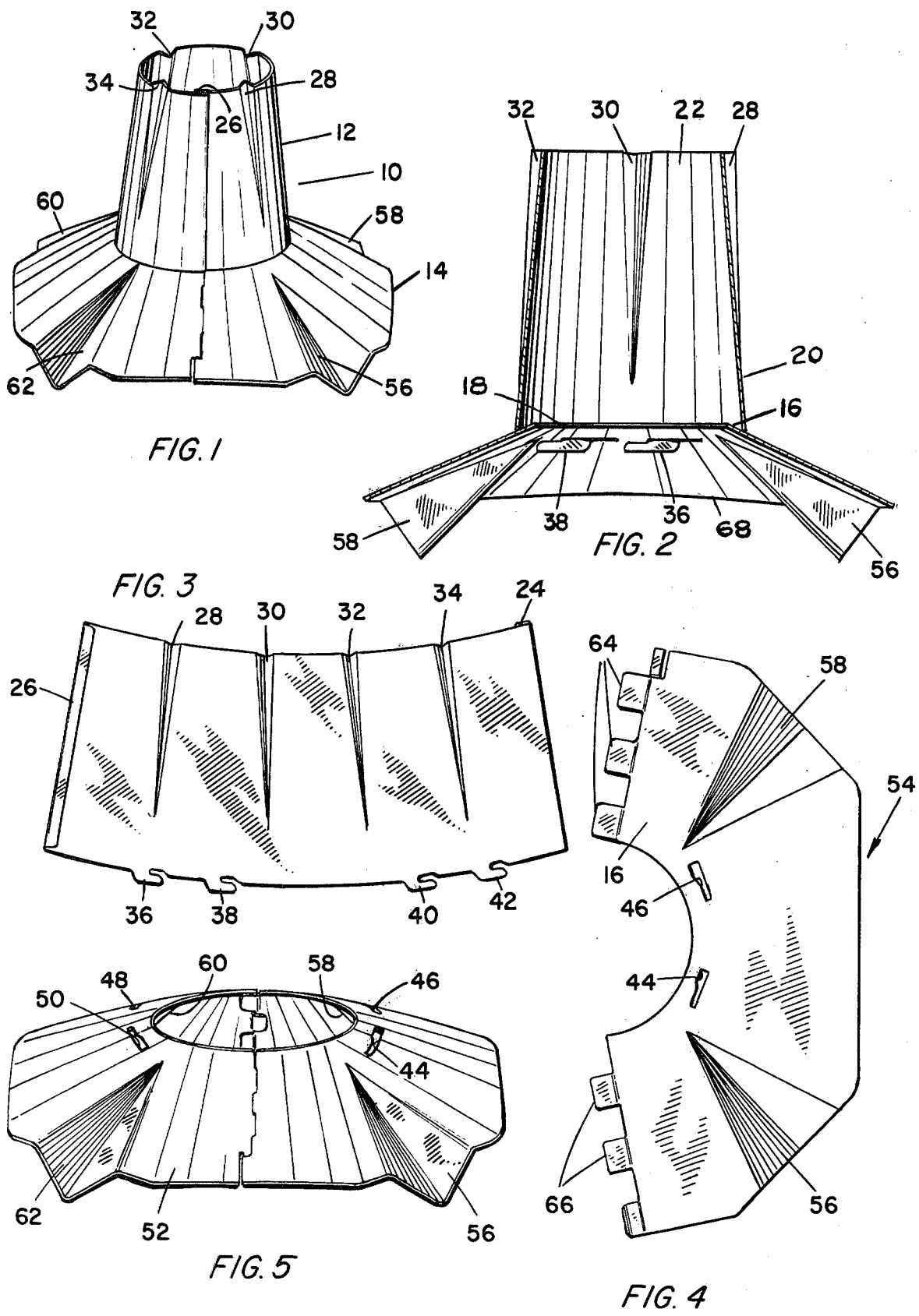

FLUE DEVICE

This invention relates to improvements in flue devices of the kind that are employed in starting fires, and it relates particularly to portable flue devices.

BACKGROUND OF THE INVENTION

Outdoor cooking fires are often difficult to ignite and, when ignited, require a time to reach cooking size and temperature which is difficult to predict. Much of the enjoyment in campfire cooking and backyard barbequing can be lost when the fire will not start or the cooking takes unduly long.

The use of coal briquettes and other commercially prepared fuels helps to overcome the uncertainty and variability in small degree. Use of liquid hydrocarbon fuels can eliminate most of the problem, except that their odor is objectionable and often affects the taste and smell of the food.

The need for liquid starter fuels is minimized by the use of a flue device. Devices of that kind have a chimney whose purpose is to create a draft through the fuel by which more air, and in particular the oxygen of the air, is made available for the combustion process. Some flue devices combine the chimney with a skirt which helps control air movement to the fire and serves to retain the heat in the fuel during start up.

Those prior flues have been large and cumbersome when effective, and a need has remained for a fire starter flue device that is easier to store and use without sacrifice of performance, and which, in fact, offers superior performance.

SUMMARY OF THE INVENTION

It is an object of the invention to provide an improved portable flue device which can facilitate the starting of fires.

It is an object to provide a flue device which is effective in the sense of helping to provide air flow to the ignited and burning fuel, and rapid removal of spent gas. But more than that, it is an object to provide a device that is practical to use and to clean and to store.

It is not difficult to promote air flow and to fan a fire with a tall chimney, but a tall chimney is a nuisance to carry to a picnic site and back. It is an object of this invention to provide a flue device which is easily assembled and disassemble but which is sturdy enough so that disassembly is not required after use. It is an object to provide a flue unit that may simply be left in assembled condition when confined to "back yard" use, but which can be taken apart and put back together with ease when it is to be used on outings away from home.

The unit includes a chimney and a skirt. Portability and convenience are achieved by dividing the skirt into two generally hemispherical sheets and by using a short, one-piece, wrap-around chimney that unwraps to a generally flat sheet form. A special fastening arrangement permits those three pieces to be interlocked in proper operational condition so that no added fasteners are required.

The assembled device, in preferred form, is less than one foot across and less than eight inches high. The chimney itself is only about five inches (four to six inches) high and is large enough in diameter to permit the pouring of "lighter fluid" and to drop small wads of burning paper down through the chimney. In preferred form, the chimney is a truncated cone about three inches in diameter at the outlet, and four inches in diameter at the inlet.

Efficient and effective movement of air through that structure is facilitated by the use of radial flow directors which depend from the lower side of the truncated conical skirt. The depth of the flow directors is diminished in the direction of the center of the skirt. It is believed that that feature, combined with the fact that the temperature of the fuel at different areas of the fire will differ during start up, may produce a vortex-like flow of combustion products from the skirt to the chimney. In any event, the radial flow directors improve performance.

The preferred embodiment employs a venturi restriction at the point at which the skirt and chimney are joined. That restriction may be, and preferably is, provided by making the central outlet opening of the skirt smaller than the inlet opening of the chimney. Inclusion of the restriction improves air flow and hastens ignition of all of the fuel below the skirt. It appears that the size of the restricted opening should be no less than the size of the outlet opening from the chimney.

THE DRAWINGS

In the drawings:

FIG. 1 is an isometric view of a portable flue in which the invention is embodied;

FIG. 2 is a cross-sectional view taken on line 2—2 of FIG. 1;

FIG. 3 is a view in elevation showing the chimney member in relaxed, flat condition;

FIG. 4 is a plan view of one of the semicircular sections of the skirt in its relaxed condition; and FIG. 5 is an isometric view of the skirt in assembled condition.

DETAILED DESCRIPTION OF THE INVENTION

A preferred form of flue according to the invention is shown in FIG. 1. It includes a chimney 12 and a skirt 14. In use, the flue 10 is placed so that its skirt overlies the fuel to be ignited. Most users can be expected to select coal briquettes as the fuel for cooking fires. To aid in igniting the briquettes it is common to add a liquid hydrocarbon fuel. However, use of the liquid fuels often have adverse effect on food taste. A number of easily ignited solid "fire starter" materials are commercially available which, like the liquids, can be ignited with a safety match. Often a wad of paper is ignited first, and the paper fire is used to heat and ignite the "fire starter" fuel.

The flue does not replace the intermediate fire starter fuel, although it can be expected that less starter fuel will be required. In particular, the need for liquid starter fuel is reduced so that its objectionable effects may not be noticeable. Use of the flue 10 provides that usual advantage and, in addition, has the advantage of aiding the rapid ignition of all of the fuel under its skirt, including the fuel directly under the chimney.

The flue 10 includes a third element—a restriction at the junction of skirt and chimney that serves to produce a venturi effect. Its primary function is to ensure that smoke, which is slightly heavier than other exhaust gasses, is accelerated up and out the short chimney. The chimney is made too short, in the interest of portability and convenience, to develop a smooth laminar flow of combustion products and air. Use of the venturi effect increases the apparent height of the chimney, at least with respect to the heavier combustion products.

The venturi restriction is formed by the peripheral margin 16 of the central outlet opening 18 of the skirt. That opening, which has a diameter of 2.5 inches to 3.5 inches (3 inches in this embodiment), is about one inch less in diameter than the 3.5 to 4.5 inch diameter of lower inlet end 20 of the chimney 12. That arrangement is best seen in FIG. 2 where the inlet end of the chimney is four inches in diameter.

The upper end 22 of the chimney has a diameter of 3.5 inches in this embodiment, one half inch smaller than the lower diameter. Thus, the chimney is a truncated cone. The upper opening size should be no less than the size of the skirt outlet opening, but smaller than the lower end of the chimney.

The chimney is formed of one piece of sheet metal as best shown in FIG. 3. Formed of light gage, resilient material, it lies almost flat in relaxed condition, but it is easily bent into conical, almost cylindrical shape. The two edges are folded over and the two folds are interfit, as shown in FIG. 1, in assembled condition. For identification, the folds are numbered 24 at one edge and 26 at the other.

The four triangular shaped creases, 28, 30, 32 and 34, of the chimney are primarily decorative. However, in the event that the chimney material is less than optimum flexibility, it will be forced to bend in somewhat greater degree at the creases and prevent the upper opening from assuming "tear drop shape."

At its lower margin, the chimney is provided with a means for connection to the skirt. In this embodiment, the fasteners are foot-shaped tabs that extend through slots in the skirt. The toe of the tabs lock under the edge of the slots when the chimney is rotated a few degrees relative to the skirt. The four tabs are numbered 36, 38, 40 and 42, respectively.

The slots in which those tabs are fitted in assembled condition are designated 44, 46, 48 and 50, respectively, as best seen in FIG. 5. The skirt 14 is shown in that figure to be formed of two generally semicircular sheets 52 and 54. The manner in which the tabs and slots cooperate is visible in the cross-sectional view of FIG. 2. The skirt is seen to form a truncated cone whose sides extend inwardly and upwardly at an angle, in this embodiment, about 25 degrees. Angles with the range 20 degrees to 30 degrees are satisfactory.

Since the chimney is short and is relatively large in diameter, its flue or "chimney" action depends in part on other structural features. The venturi restriction is one of those features, and the use of flow directors at the under surface of the skirt is another. The flow directors are barriers that depend from the lower surface of the skirt and extend radially. They serve to direct flow of air toward the central opening of the skirt. They need not have uniform height but may diminish in height toward the central outlet opening of the skirt, as in the preferred form shown in the drawing. The flow directors are formed as V-shaped channels pressed into the metal sheets that form the skirt. Each channel is characterized by three fold lines that converge toward the central opening 18, as illustrated in FIGS. 1, 2, 4 and 5 where the four channels are identified by the numerals 56, 58, 60 and 62, respectively.

The use of the channel arrangement to form the flow directors complicates the shape of the metal blanks from which the skirt is formed and increases tooling cost in some degree. However, if that is a disadvantage, it is small when compared to the fact that the flow directors' V-shape results in their serving as feet for the unit so that the skirt stands a little above the fuel on which it is placed. The V-shape makes the director serve especially well as a foot when briquettes are used as fuel. Further, the V-shape has a decorative effect which is repeated in the chimney for aesthetic reasons, as described above.

Rather than being truly circular, the outer margins of the skirt are cut away in the regions between the V-shaped flow directors. Thus, in this preferred form, the assembled skirt looks somewhat square with rounded corners when viewed from above. That will be apparent from an examination of FIGS. 1, 4 and 5. The effect of that shape may be seen in FIG. 2 where the outer edges of the skirt are shown to be arched upwardly in the areas between the flow directors. For identification, in FIG. 2 the skirt edge section between flow directors 56 and 58 is numbered 68. For the skirt dimensions given above, the edge section 68 stands about one-eighth inch at the section center above the imaginary chords that connect the edges of the respective sections.

That arcuate shape provides an unexpected result best explained in terms of its effect when briquettes are used as the fuel. Briquettes turn light grey, or white, when ignited in the areas that have been ignited. If the skirt does not have this arcuate shape, the briquettes under the center of the unit ignite last, after the briquettes under the outer edges of the skirt have been ignited. When the skirt has the arcuate shape shown in FIG. 2, it is the center briquettes that ignite first and more rapidly.

The skirt is several inches high in assembled condition. So that it will be relatively flat when the flue is disassembled, it is divided into two generally hemispherical sections, as described above. The sections may be, and in this case they are, identical. The outer perimeter is shaped to minimize material cost, in the form of a pollygon with rounded corners. The edges of the two semicircular sheet sections are provided with a fastening means by which the sections may be locked together while maintaining the assembled skirt in conical shape. In this preferred embodiment, that means comprises a series of tabs or teeth projecting from the side edges and spaced in comb fashion. The teeth at each end are arranged so that they will fit between the teeth at the adjacent end of the other semi-circular skirt sheet. The teeth are offset upward from the plane of the sheet a distance substantially equal to the thickness of the sheet so that the teeth will lie flat against the upper surface of the adjacent feet as shown in FIG. 6. For identification, the teeth at one end of sheet 54 are designated 64, and those at the other end are designated 66.

Although I have shown and described certain specific embodiments of my invention, I am fully aware that many modifications thereof are possible. My invention, therefore, is not to be restricted except insofar as is necessitated by the prior art.

I claim:

1. An improved portable flue device comprising, in combination:
   a chimney;
   a frusto-conical skirt extending downwardly and outwardly from said chimney, said skirt comprises flow channeling means for directing air flow radially inward from the edge to the central opening of said skirt, said flow channeling means acting to limit the area, at the edge of the skirt, available to accommodate air flow to the chimney; and means in the form of a venturi restriction for accelerating gas flow from skirt to chimney.

2. The invention defined in claim 1 in which said skirt has a central outlet opening the area of which is from one-twelfth to one-ninth of the area under said skirt.

3. The invention defined in claim 1 in which the diameter of the inlet end of said chimney is greater than the outlet opening of the skirt whereby said venturi restriction is formed by the margin area of the skirt that forms the peripheral margins of said outlet opening of the skirt.

4. The invention defined in claim 3 in which said flow channeling means comprises a plurality of separators extending downwardly from said skirt in a degree that diminishes toward the center of said skirt.

5. The invention defined in claim 4 in which radial flow channeling means are formed as elongated V-shaped offsets in the material of the skirt which extend downwardly and open upwardly.

6. The invention defined in claim 4 in which said chimney is frusto-conical with its upper outlet smaller in area than its lower inlet.

7. The invention defined in claim 6 in which the outlet of said chimney is no smaller in area than the area of the outlet opening of said skirt.

8. The invention defined in claim 6 in which the outlet of said chimney exceeds in area the area of the flow path through said venturi restriction.

9. The invention defined in claim 8 in which the surface of said skirt rises toward its center at an angle between twenty and thirty degrees.

10. The invention defined in claim 9 in which said chimney has a height no less than the diameter of the outlet opening of said skirt.

11. The invention defined in claim 9 in which said chimney has a height between one and one-half and two times the diameter of said outlet opening of said skirt.

12. The invention defined in claim 9 in which said chimney has a height of five inches, an upper diameter of three and one-half inches, and a lower diameter of four inches, and in which said skirt has an outlet opening three inches in diameter.

13. The invention defined in claim 4 in which said skirt comprises sheets of metal generally semi-circular in shape and flat when relaxed, said skirt further comprising means in the form of complimentary conformations at their radial edges for interfitting said hemispherical sheets such that together they define a frustrated cone.

14. The invention defined in claim 13 which further comprises means in the form of conformations on the lower edge of said chimney and openings in said sheets for securing said chimney to said skirt when said sheets are assembled in frusto-conical shape.

* * * * *